United States Patent [19]

Koch

[11] Patent Number: 5,055,087

[45] Date of Patent: Oct. 8, 1991

[54] TRANSMISSION FOR DRIVING A MACHINE TOOL SPINDLE

[75] Inventor: Loyd L. Koch, Rockford, Ill.

[73] Assignee: Bourn & Koch Machine Tool Co., Rockford, Ill.

[21] Appl. No.: 619,480

[22] Filed: Nov. 29, 1990

[51] Int. Cl.$^5$ ............................................. F16H 9/00
[52] U.S. Cl. .................................................. 474/73
[58] Field of Search .............................. 474/73, 84–89

[56] References Cited

U.S. PATENT DOCUMENTS

| | | | |
|---|---|---|---|
| 2,240,737 | 5/1941 | Young | 474/73 |
| 2,346,731 | 4/1944 | Collins | 474/73 |
| 2,828,845 | 4/1958 | Thornton | 474/73 x |

Primary Examiner—Thuy M. Bui
Attorney, Agent, or Firm—Leydig, Voit & Mayer, Ltd.

[57] ABSTRACT

A variable speed motor rotates the spindle of a machine tool by way of a two-speed transmission. The transmission includes two endless belts extending directly between the spindle and the output shaft of the motor. One belt is connected to the output shaft and is adapted to be selectively coupled to the spindle by a clutch which is coaxial with the spindle. The other belt is connected to the spindle and is adapted to be selectively coupled to the output shaft by a second clutch which is coaxial with the shaft.

14 Claims, 5 Drawing Sheets

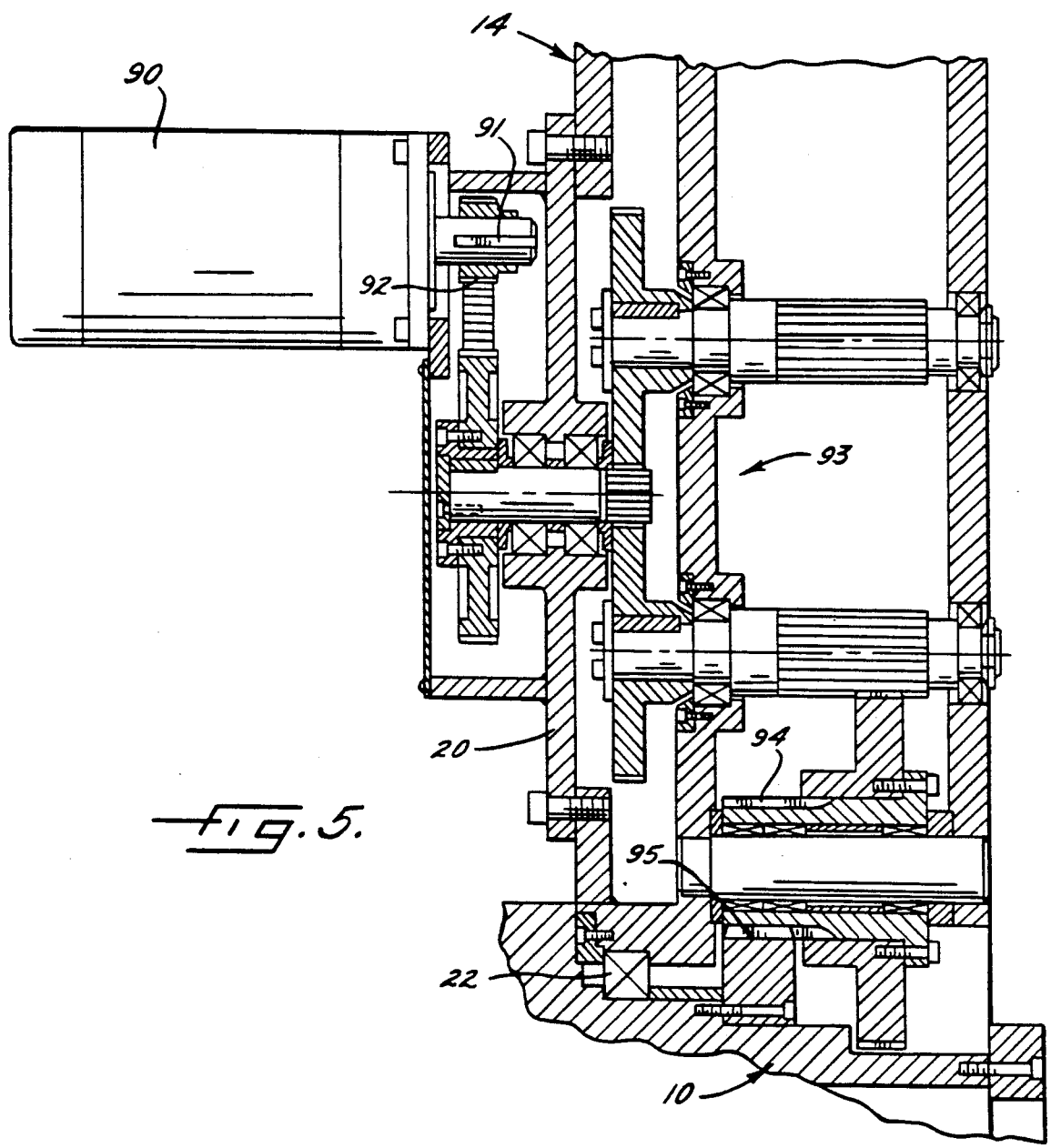

TRANSMISSION FOR DRIVING A MACHINE TOOL SPINDLE

Background of the Invention

This invention relates generally to a machine tool head and, more particularly, to a machine tool head with a two-speed transmission for driving the tool spindle of the head. Even more specifically, the invention relates to a multi-axis head of the type which is adapted to be rotated about an axis extending perpendicular to the axis of the spindle in order to enable the spindle to be tilted to different positions.

Such a head typically includes a variable speed motor for driving the spindle. Within a given speed range, the motor is capable of developing full horsepower. In order to gear the output of the motor up or down, provision is made of a two-speed transmission which effects driving of the spindle at either a high speed ratio or a low speed ratio. Prior transmissions rely on gear drives or on combination gear and belt drives and are rather complex because of the gears and the need for shafts, bearings and other parts for mounting the gears. Also, the use of a gear drive inherently results in a loss of efficiency.

Summary of the Invention

The general aim of the present invention is to provide a machine tool head having a comparatively simple and high efficiency two-speed transmission.

A more detailed object of the invention is to achieve the foregoing through the provision of a transmission in which belts extend directly between the spindle and the motor output shaft and are selectively clutched to the spindle and the shaft in order to effect driving of the spindle at either a low speed ratio or a high speed ratio.

Another object of the invention is to provide a drive in which the spindle is subjected to a large flywheel effect at the low speed ratio in order to provide torsional damping and is subjected to a small flywheel effect at the high speed ratio in order to enable the spindle to quickly accelerate to a high speed.

The invention also resides in the provision of a direct belt drive which significantly simplifies a rotary head capable of tilting the spindle to various positions.

These and other objects and advantages of the invention will become more apparent from the following detailed description when taken in conjunction with the accompanying drawings.

BRIEF DESCRIPTION OF THE DRAWINGS

FIG. 5 is an enlarged cross-sectional view of mechanism for rotating the head for purposes of tilting the spindle.

DETAILED DESCRIPTION OF THE PREFERRED EMBODIMENT

Figure 1:
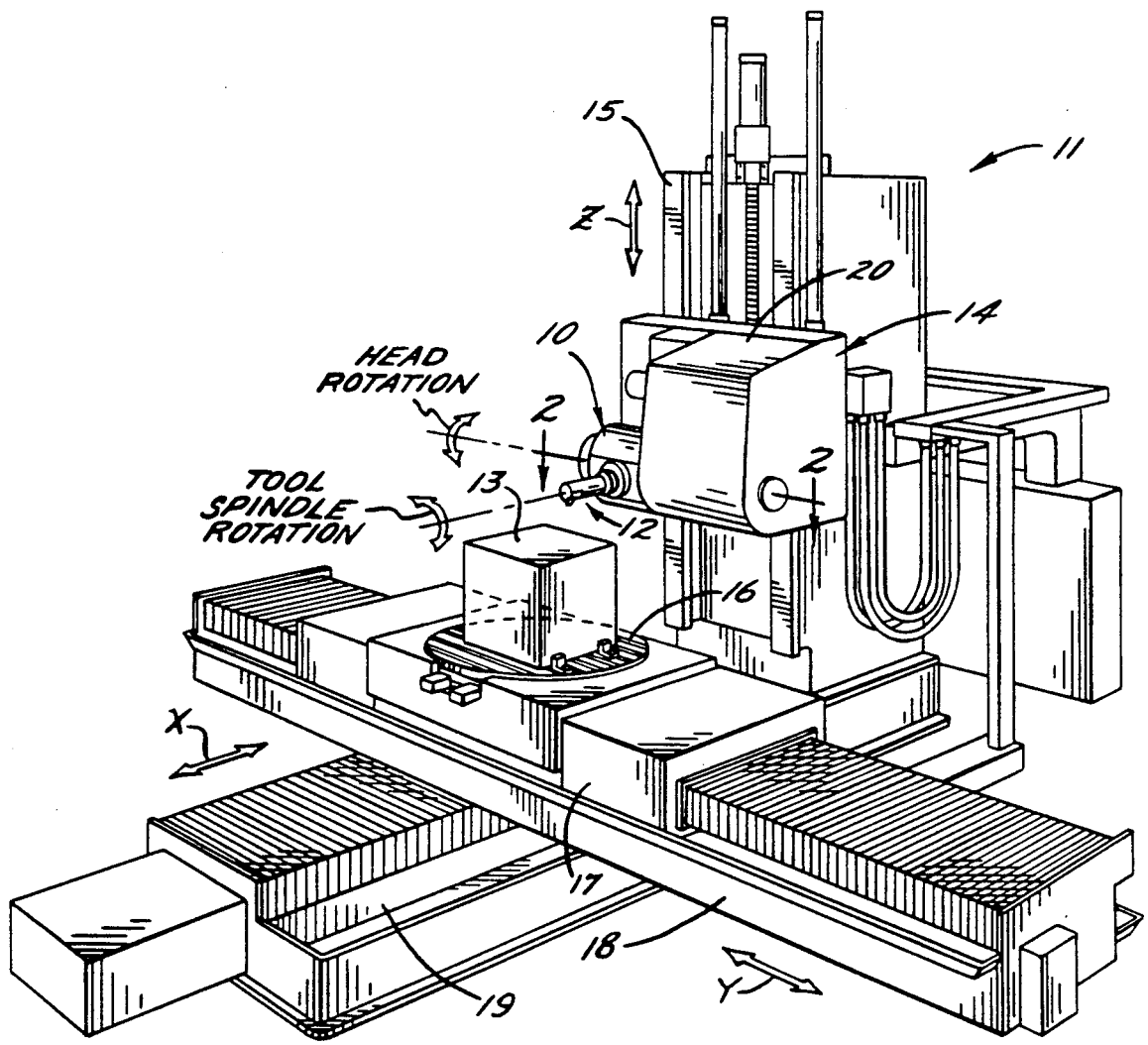
FIG. 1 is a perspective view of a typical machine tool with a new and improved head incorporating the unique features of the present invention.

As shown in the drawings for purposes of illustration, the invention is embodied in a head 10 for use in conjunction with a multi-axis machine tool 11, the head serving to rotate a suitable cutting tool 12 such as a drilling, boring or milling cutter for machining a workpiece 13. In the specific machine tool 11 which has been shown, the head 10 is associated with a carriage 14 which is supported to move upwardly and downwardly along a Z-axis by a vertically extending column 15.

The tool 12 projects outwardly from the head 10 and is adapted to be rotated about its own axis in order to machine the workpiece 13. To enable the tool to be tilted to various positions relative to the workpiece, the head is adapted to be rotated relative to the carriage 14 about a horizontal axis extending perpendicular to the axis of the tool (see FIG. 1). Further relative positioning of the tool and the workpiece is effected by supporting the workpiece on a rotary turntable 16 carried on a slide 17 which is movable on a carriage 18 along a Y-axis. The carriage 18, in turn, is movable on an underlying bed 19 along an X-axis. Such a machine tool is well known in and of itself and is sold under the trade designator OMNIMILL.

The carriage 14 includes a box-like housing 20 which supports the head 10, part of the head being located in the housing and another part projecting outwardly from the housing. A bearing 21 (FIG. 2) at the outboard end of the head is supported by part of the carriage and coacts with an inboard bearing 22 and with additional bearings (not shown) to support the head to rotate about a horizontal axis relative to the carriage.

Figure 2:
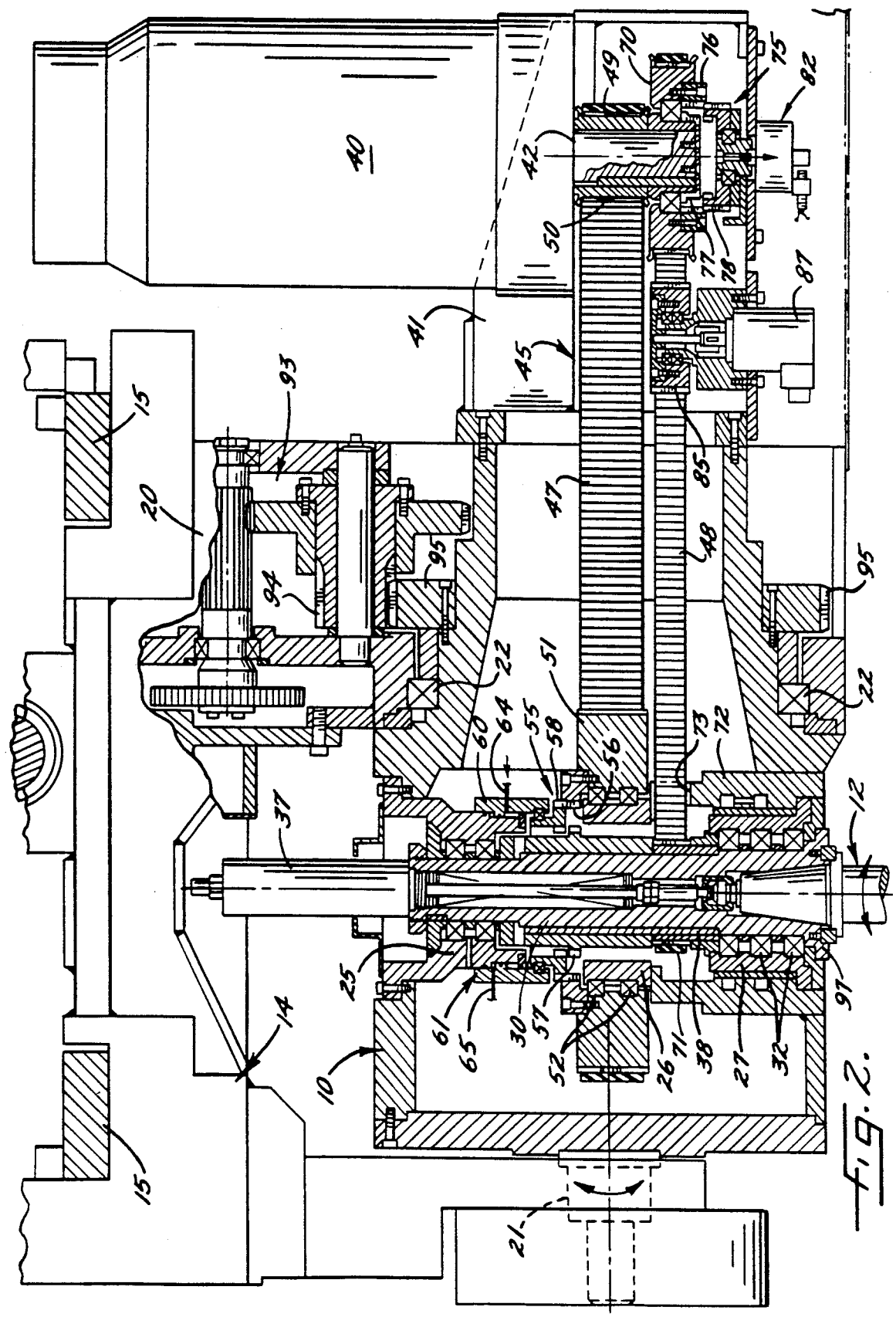
FIG. 2 is an enlarged fragmentary cross-section taken substantially along the line 2—2 of FIG. 1.
Figure 3:
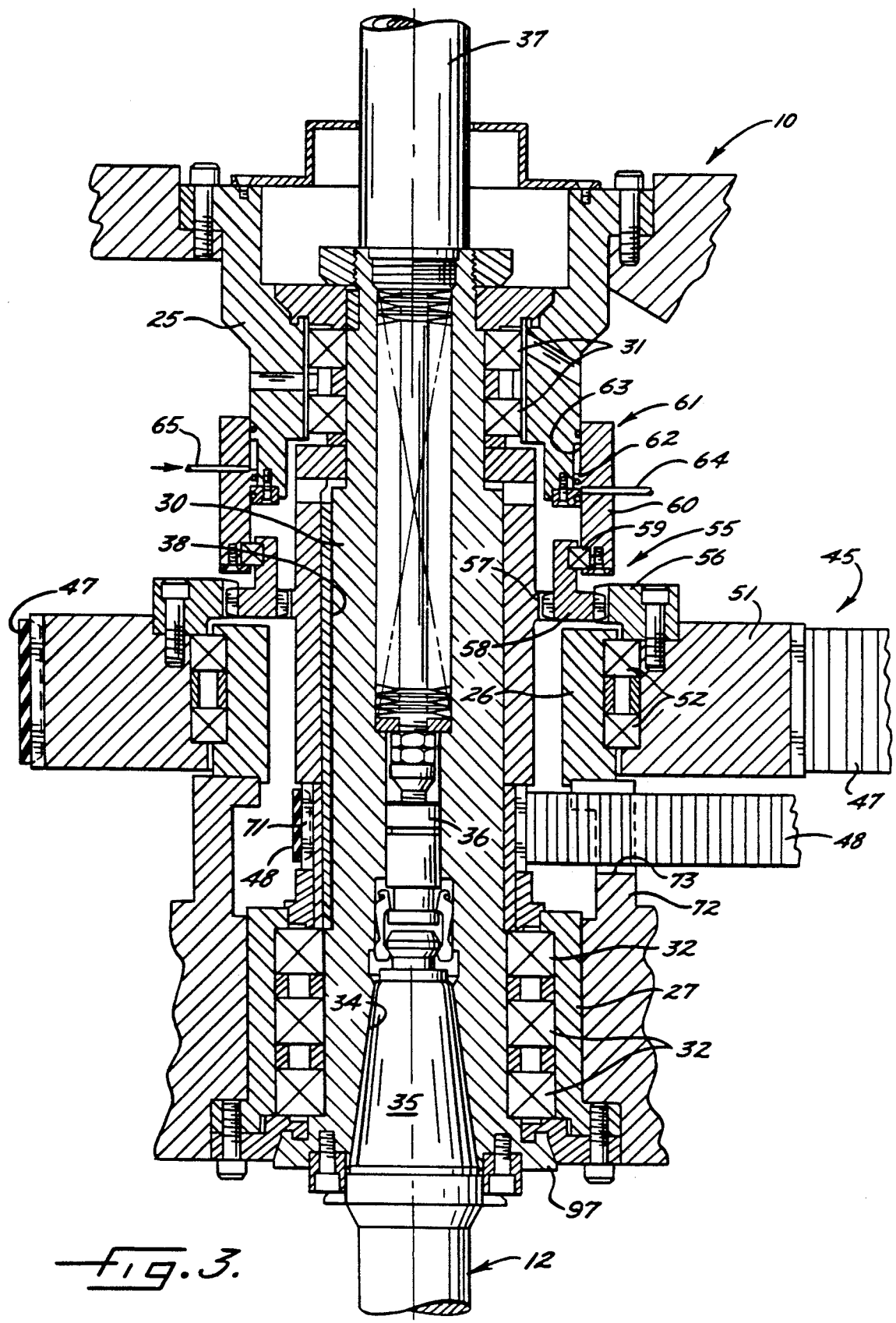
FIG. 3 is an enlarged view of the spindle portion of the head shown in FIG. 2.

As shown in FIGS. 2 and 3, the head 10 is a generally horizontally extending tubular support member which carries fixed housing components 25, 26, and 27. A tubular spindle 30 (FIG. 3) is journaled for rotation by bearings 31 in the housing component 25 and by bearings 32 in the housing component 27. One end portion of the spindle is formed with a tapered bore 34 which receives a tapered shank 35 on the tool 12. Clamping of the shank in the bore is effected by a conventional draw bar 36 located within the spindle and connected to a reciprocating hydraulic actuator 37 for shifting the draw bar axially between clamped and released positions.

Rotation of the spindle 30 is effected by a variable speed electric motor 40 (FIGS. 2 and 4) supported on an inboard end portion 41 of the head and having a rotary output shaft 42 that extends parallel to the spindle. The specific motor which has been shown is a 25 horsepower motor and is capable of developing full horsepower at speeds ranging between about 575 RPM and 4500 RPM.

At times, it is necessary to drive the spindle 30 at speeds substantially lower or substantially higher than the speed range of the motor 40. For this purpose, the drive shaft 42 of the motor is connected to the spindle by a two-speed transmission 45. When the particular transmission which has been illustrated is shifted to its low speed ratio, the spindle may be driven at a speed as low as 125 RPM. Shifting of the transmission to its high speed ratio enables the speed of the spindle to be increased to as high as 8,000 RPM.

In accordance with the present invention, the transmission 45 is totally free of gears and is of a comparatively simple and high efficiency construction. This is achieved through the provision of a transmission in which endless drive means in the form of belts 47 and 48 directly drive the spindle 30 from the motor shaft 42 and are adapted to be uniquely clutched to the spindle and the motor shaft, respectively.

More specifically, the belt 47 is the low speed ratio belt and is in the form of a cogged timing belt. The low speed belt is trained around a relatively small diameter cogged driving wheel 49 (FIGS. 2 and 4) which is keyed at 50 to the motor output shaft 42. In addition, the belt 47 is trained around a larger diameter cogged driven wheel 51 (FIGS. 2 and 3) which is associated with the spindle 30.

Pursuant to the invention, the driven wheel 51 is not supported directly by the spindle 30 but instead is journaled to rotate relative to the spindle by bearings 52 (FIG. 3) which are supported on the outer side of the housing component 26. In this way, the belt 47 can be tensioned under high load (e.g., 1800 lbs.) between the wheels 49 and 51 to enable high torque to be transmitted to the spindle at low speeds and yet, at the same time to isolate the spindle from the belt tension and thereby reduce deflection of the spindle.

Clutch means 55 (FIG. 3) are coaxial with the spindle 30 and serve to couple the driven wheel 51 to the spindle when the spindle is to be driven at the low speed ratio. When the spindle is to be driven at the high speed ratio, the clutch means are released to uncouple the driven wheel from the spindle and to allow relative rotation between the two.

In this specific instance, the clutch means 55 comprise an internally toothed ring 56 (FIG. 3) which is secured to and is coaxial with the driven wheel 51. The ring 56 is spaced radially outwardly from an externally toothed ring 57 which herein is in the form of a sleeve keyed at 38 to the spindle 30 and having an annular row of teeth on its outer side.

As shown in FIG. 3, the clutch 55 also includes a clutch ring 58 which is formed both with external teeth and internal teeth. The clutch ring 58 is supported for rotation by a bearing 59 carried within a sleeve 60 which is supported to slide axially on the bearing housing component 25.

When the clutch 55 is disengaged as shown in FIG. 2, the sleeve 60 is positioned axially such that the external teeth of the clutch ring 58 are in engagement with the internally toothed ring 56 on the driven wheel 51 but are spaced axially from and are out of engagement with the externally toothed ring 57 on the spindle 30. Under these circumstances, driving of the belt 47 by way of the motor shaft 42 and the driving wheel 49 simply causes the driven wheel 51 and the internally toothed ring 56 to rotate idly around the bearings 52 and without transmitting torque to the spindle. During such rotation, the clutch ring 58 turns with the internally toothed ring 56 as permitted by the bearing 59 in the sleeve 60.

Axial shifting of the sleeve 60 to the position shown in FIG. 3 causes the internal teeth of the clutch ring 58 to move axially into engagement with the externally toothed ring 57 on the spindle 30. As a result, the clutch ring 58 drivingly couples the ring 56 to the ring 57 so as to cause torque to be transmitted from the driven wheel 51 to the spindle 30. During driving of the spindle, the clutch ring 58 turn in the bearing 59.

Advantageously, axial shifting of the sleeve 60 to engage and disengage the clutch 55 is effected by a simple and compact hydraulic actuator 61. As shown in FIG. 3, an annular land 62 is formed around the inner side of the sleeve 60 and defines a piston element. The land is located within a radial space 63 between the inner side of the sleeve 60 and the outer side of the bearing housing component 25 and divides the space into two chambers. When pressurized hydraulic oil is admitted into one of the chambers via a line 64, the pressure acts against the land 62 to shift the sleeve 60 axially from the position shown in FIG. 3 to the position shown in FIG. 2 and thereby disengage the clutch 55. Conversely, hydraulic oil admitted into the other chamber by way of a line 65 acts reversely against the land 62 to shift the sleeve 60 axially in the opposite direction and back to the position of FIG. 3 in order to engage the clutch. Thus, the clutch is hydraulically operated by an actuator 61 which is both radially and axially compact and which does not encumber the space in the vicinity of the spindle 30.

The high speed ratio drive belt 48 is also a cogged belt and is trained around a relatively large diameter drive wheel 70 (FIGS. 2 and 4) which is coaxial with the motor shaft 42 and a smaller diameter driven wheel 71 (FIGS. 2 and 3) which is coaxial with the spindle 30. The driven wheel 71 is disposed in a spindle housing component 72 and is keyed or otherwise fixed to the spindle so as to rotate with the spindle at all times. To permit the belt 48 to be trained around the small diameter driven wheel 71 within the housing component 72, the latter is formed with a pair of circumferentially spaced entrance and exit openings or notches 73 (only one notch being visible) which enable the entering run of the belt to move into the housing component and the exiting run of the belt to leave the housing component.

Figure 4:
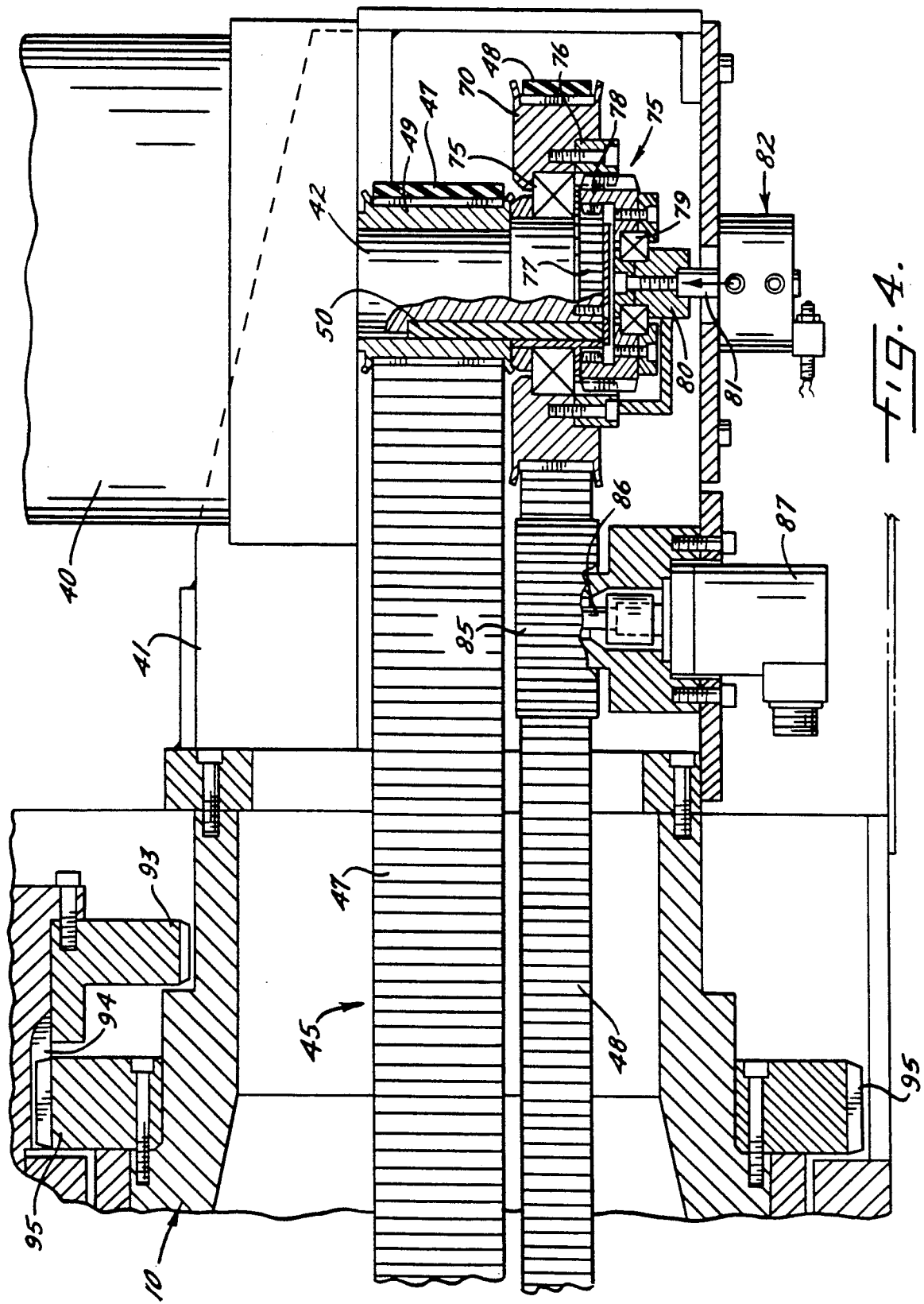
FIG. 4 is an enlarged view of the drive motor portion of the head shown in FIG. 2.

As shown in FIG. 4, the drive wheel 70 is supported to rotate on the shaft 42 by a bearing 74. When the spindle 30 is to be driven at the high speed ratio, clutch means 75 similar to the clutch means 55 are engaged. The clutch means 75 include an internally toothed ring 76 which is connected rigidly to the drive wheel 70. Spaced inwardly from the internally toothed ring 76 and secured to the shaft 42 adjacent the bearing 75 is an externally toothed ring 77. A clutch ring 78 which is formed both with external teeth and internal teeth is adapted to be interposed between the rings 76 and 77.

The clutch ring 78 is rotatably journaled by a bearing 79 which is supported on a block 80. The latter is carried by the rod 81 of a double-acting reciprocating hydraulic actuator 82 which is supported by the head portion 41.

When the rod 81 of the actuator 82 is retracted as shown in FIG. 2, the clutch ring 78 is positioned with its external teeth in engagement with the internally toothed ring 76 but with its internal teeth spaced axially from and disposed out of engagement with the externally toothed ring 77. Thus, rotation of the drive shaft 42 simply results in the externally toothed ring 77 turning idly with no torque being transmitted to the internally toothed ring 76, the driving wheel 70, the belt 48 or the spindle 30. When the clutch 75 is thus disengaged, the clutch 55 may be engaged to effect driving of the spindle 30 at the low speed ratio by way of the belt 47.

Advancement of the rod 81 of the actuator 82 results in the clutch ring 78 moving axially into engagement with the externally toothed ring 77 as shown in FIG. 4. The clutch ring 78 thus acts between the externally toothed ring 77 and the internally toothed ring 76 to couple the drive wheel 70 for rotation with the shaft 42 and thereby effect driving of the spindle 30 at the high speed ratio by way of the belt 48. During such driving, the clutch ring 78 turns on the block 80 as permitted by the bearing 79. Also, the clutch 75 is, of course, engaged to effect driving at the high speed ratio only when the clutch 55 is disengaged.

As shown in FIG. 4, a toothed wheel 85 meshes with the inner side of one run of the belt 48. The wheel 85 is carried on and serves to rotate the shaft 86 of an encoder 87 which generates feedback signals representative of the speed and angular position of the spindle 30. When the spindle is being driven at the low speed ratio, the spindle backdrives the belt 48 via the driven wheel 71 and thus the encoder 87 is operated at both speed ratios.

Rotation of the head 10 about its own axis for purposes of tilting the spindle 30 is effected by a motor 90 (FIG. 5) secured to the housing 20 of the carriage 14 and having a drive shaft 91 with a pinion 92 thereon. The latter acts through a planetary drive 93 to rotate a splined gear 94 which, in turn, meshes with an annular bull gear 95 extending around and secured to the head 10 between the spindle 30 and the motor 40.

To summarize, driving of the spindle 30 at the low speed ratio is effected by way of the belt 47 while the clutch 55 is engaged and the clutch 75 is disengaged. Since the large driven wheel 51 is isolated from the spindle by the bearings 52, the high tension in the belt 47 does not deflect the spindle. Also, the relatively large diameter driven wheel 51 causes the spindle to have a high flywheel effect when the spindle is rotated at the low speed ratio. As a result, the driven wheel serves to torsionally dampen the spindle so as to reduce chatter of the tool 12 at the low speed ratio.

To effect driving of the spindle 30 at the high speed ratio, the clutch 55 is disengaged and the clutch 75 is engaged. This results in the spindle being rotated by way of the drive wheel 70, the belt 48 and the driven wheel 71. Because the driven wheel 71 is located inside of the housing component 72 and is of small diameter, it does not cause the spindle to have a large flywheel effect when the spindle is rotated at the high speed ratio. Indeed, when the spindle is rotated at the high speed ratio, the rotating portion of largest diameter is at the extreme tool end of the spindle as indicated at 97 in FIG. 3. Since the diameter of the drive wheel 71 is smaller than the diameter of the spindle portion 97, the driven wheel contributes only negligibly to the flywheel effect on the spindle and thus does not encumber rapid acceleration of the spindle to high speeds.

Because the spindle 30 is driven directly by the belts 47 and 48 and the clutches 55 and 75, the need for gears for establishing the drive is avoided. Thus, shafts and other components for mounting gears may be eliminated and, in addition, the present transmission does not suffer the losses inherently occurring in a gear drive. The lack of gears also simplifies supporting of the head 10 for rotation since only the two straight belts 47 and 48 need extend through the head from the motor shaft 42 to the spindle 30.

I claim:

1. A machine tool head having a support, a spindle rotatably mounted on said support and adapted to hold and rotate a tool, and means for selectively rotating said spindle at either a low speed ratio or a higher speed ratio, said means comprising a motor mounted on said support and having a rotatable output shaft, a small diameter drive wheel fixed to rotate with said output shaft about an axis thereof, a larger diameter driven wheel rotatable on said spindle about an axis thereof, first endless drive means drivingly coupling said drive wheel to said driven wheel, a large diameter drive wheel rotatable on said drive shaft about an axis thereof, a smaller diameter driven wheel fixed to rotate with said spindle about an axis thereof, second endless drive means drivingly coupling said large diameter drive wheel to said smaller diameter driven wheel, a first selectively engageable clutch coaxial with said spindle and operable when engaged to couple said larger diameter driven wheel for rotation with said spindle, and a second selectively engageable clutch coaxial with said shaft and operable when engaged to drivingly couple said large diameter drive wheel for rotation with said shaft.

2. A machine tool head as defined in claim 1 in which said support includes a housing having inner and outer sides, the inner side of said housing rotatably receiving said spindle, and bearing means supporting said larger diameter driven wheel for rotation on the outer side of said housing.

3. A machine tool head as defined in claim 2 in which said smaller diameter driven wheel is located within said housing, and opening means extending between the inner and outer side of said housing and permitting said second endless drive means to enter and leave said housing.

4. A machine tool head as defined in claim 3 in which the diameter of said smaller diameter driven wheel is no greater than the largest diameter of said spindle.

5. A machine tool head as defined in claim 2 in which said smaller diameter driven wheel is located within said housing, the diameter of said smaller diameter driven wheel being no greater than the largest diameter of said spindle.

6. A machine tool head as defined in claim 1 in which said support is tubular and is mounted to turn about an axis extending perpendicular to the axis of said spindle, said spindle and said shaft being parallel to one another and being located at opposite end portions of said tubular support, and said first and second endless drive means extending through said tubular support from said drive wheels to said driven wheels.

7. A machine tool head as defined in claim 1 in which said first clutch comprises an internally toothed ring fixed to and coaxial with said larger diameter driven wheel, an externally toothed ring fixed to and coaxial with said spindle and spaced radially inwardly from said internally toothed ring, and a clutch ring having external teeth adapted to engage said internally toothed ring and having internal teeth adapted to engage said externally toothed ring, said clutch ring being coaxial with and rotatable relative to said spindle and being supported to shift axially relative to said spindle between engaged and released positions, the teeth of said clutch ring engaging both said internally toothed ring and said externally toothed ring when said clutch ring is in said engaged position and being out of engagement with at least one of said internally toothed ring and said externally toothed ring when said clutch ring is in said released position, and selectively operable means for shifting said clutch ring axially between said engaged and released positions.

8. A machine tool head as defined in claim 7 in which said clutch ring remains in engagement with said internally toothed ring when said clutch ring is in said released position.

9. A machine tool head as defined in claim 7 in which said support includes a bearing housing which receives said spindle, said means for shifting said clutch ring comprising a sleeve supported to shift axially on said housing, the interior of said sleeve being spaced radially from the exterior of said housing and having a piston element therein whereby said housing, said sleeve and said piston element coact to define first and second chambers separated by said piston element, and means for selectively introducing pressure fluid into either said first chamber or said second chamber.

10. A machine tool head as defined in claim 9 in which said clutch ring is supported to shift axially with and to rotate relative to said sleeve.

11. A machine tool head as defined in claim 1 in which said second clutch comprises an internally toothed ring fixed to and coaxial with said large diameter drive wheel, an externally toothed ring fixed to and coaxial with said shaft and spaced radially inwardly from said internally toothed ring, and a clutch ring having external teeth adapted to engage said internally toothed ring and having internal teeth adapted to engage said externally toothed ring, said clutch ring being coaxial with and rotatable relative to said shaft and being supported to shift axially relative to said shaft between engaged and released positions, the teeth of said clutch ring engaging both said internally toothed ring and said externally toothed ring when said clutch ring is in said engaged position and being out of engagement with at least one of said internally toothed ring and said externally toothed ring when said clutch ring is in said released position, and selectively operable means for shifting said clutch ring axially between said engaged and released positions.

12. A machine tool head as defined in claim 11 in which said selectively operable means comprise a fluid-operated actuator connected to said clutch ring.

13. A machine tool head as defined in claim 11 in which said clutch ring remains in engagement with said internally toothed ring when said clutch ring is in said released position.

14. A machine tool head as defined in claim 7 in which said second clutch comprises a second internally toothed ring fixed to and coaxial with said large diameter drive wheel, a second external toothed ring fixed to and coaxial with said shaft and spaced radially inwardly from said second internally toothed ring, and a second clutch ring having external teeth adapted to engage said second internally toothed ring and having internal teeth adapted to engage said second externally toothed ring, said second clutch ring being coaxial with and rotatable relative to said shaft and being supported to shift axially relative to said shaft between engaged and released positions, the teeth of said second clutch ring engaging both said second internally toothed ring and said second externally toothed ring when said second clutch ring is in said engaged position and being out of engagement with at least one of said second internally toothed ring and said second externally toothed ring when said second clutch ring is in said released position, and selectively operable means for shifting said second clutch ring axially between said engaged and released positions.

* * * * *